(12) United States Patent
Eng et al.

(10) Patent No.: US 9,533,539 B2
(45) Date of Patent: Jan. 3, 2017

(54) VEHICLE SUSPENSION SYSTEM AND METHOD OF USING THE SAME

(75) Inventors: Donald Eng, Markham (CA); Robert G. Izak, Dryden, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 92 days.

(21) Appl. No.: 13/277,795

(22) Filed: Oct. 20, 2011

(65) Prior Publication Data

US 2013/0103259 A1   Apr. 25, 2013

(51) Int. Cl.
*B60G 23/00* (2006.01)
*G06F 19/00* (2011.01)
*B60G 17/0165* (2006.01)
*B60G 17/019* (2006.01)

(52) U.S. Cl.
CPC ......... *B60G 17/0165* (2013.01); *B60G 17/019* (2013.01); *B60G 2401/142* (2013.01)

(58) Field of Classification Search
USPC ......................................................... 356/601
See application file for complete search history.

(56) References Cited

U.S. PATENT DOCUMENTS

| | | | | |
|---|---|---|---|---|
| 4,600,215 A | * | 7/1986 | Kuroki | B60G 17/0165 180/169 |
| 4,634,142 A | * | 1/1987 | Woods | B60G 17/0155 188/282.2 |
| 4,781,465 A | * | 11/1988 | Demachi | B60G 17/0165 356/3.07 |
| 4,792,232 A | * | 12/1988 | Jobe | G06T 7/0057 348/128 |
| 4,827,416 A | * | 5/1989 | Kawagoe | B60G 17/016 280/5.512 |

(Continued)

FOREIGN PATENT DOCUMENTS

| | | | |
|---|---|---|---|
| DE | 4119494 | * | 1/1992 |
| DE | 4130877 | * | 3/1992 |

(Continued)

OTHER PUBLICATIONS

Song, Xubin, "Design of Adaptive Vibration Control Systems with Application of Magneto-Rheological Dampers," Virginia Polytechnic Institute and State University, Blacksburg, Virginia, Feb. 1999 (hereinafter "Song").*

(Continued)

*Primary Examiner* — Jean-Paul Cass
(74) *Attorney, Agent, or Firm* — Reising Ethington, P.C.; David P. Hudyma

(57) ABSTRACT

A system and method that may inspect an upcoming road segment and use that information to control certain aspects of a vehicle suspension system. In an exemplary embodiment, several cameras are used to evaluate an upcoming road segment and to provide road information to a control module so that damping and/or other aspects of an active or semi-active suspension system can be controlled in a feed-forward manner. Because the vehicle suspension system assesses a segment of the road that is ahead of the vehicle, as opposed to one currently being encountered by the vehicle, the system may improve ride performance by anticipating and preparing for road conditions before they are actually encountered.

17 Claims, 2 Drawing Sheets

(56) References Cited

U.S. PATENT DOCUMENTS

| | | | | |
|---|---|---|---|---|
| 5,061,932 | A | * | 10/1991 | Tribe .................. B60G 17/019 342/70 |
| 5,163,319 | A | * | 11/1992 | Spies .................. B60G 17/019 356/601 |
| 5,347,457 | A | * | 9/1994 | Tanaka ............... B60G 17/0164 280/5.514 |
| 5,450,322 | A | * | 9/1995 | Tanaka ............... B60G 17/0165 280/5.518 |
| 5,652,655 | A | * | 7/1997 | Uno ........................ B60T 8/172 356/600 |
| 6,028,948 | A | * | 2/2000 | Kil .......................... E01C 23/01 382/108 |
| 6,122,578 | A | * | 9/2000 | Knolle ............... B60G 17/0152 180/164 |
| 6,233,510 | B1 | * | 5/2001 | Platner .................. B60G 13/16 382/104 |
| 6,980,291 | B2 | * | 12/2005 | Saito .................. G01B 11/2513 356/237.2 |
| 7,092,106 | B2 | * | 8/2006 | Cox ....................... G01B 11/25 356/601 |
| 7,110,021 | B2 | * | 9/2006 | Nobori .................... G01S 11/12 348/135 |
| 7,706,978 | B2 | * | 4/2010 | Schiffmann ........... G01S 7/4026 340/436 |
| 7,872,764 | B2 | * | 1/2011 | Higgins-Luthman B60G 17/019 280/5.5 |
| 8,355,840 | B2 | | 1/2013 | Ammon |
| 8,413,773 | B2 | * | 4/2013 | Anderfaas ............... F16F 9/535 188/267 |
| 8,676,508 | B2 | | 3/2014 | Schwarz |
| 2006/0114477 | A1 | * | 6/2006 | Cox ....................... G01B 11/25 356/602 |
| 2007/0055446 | A1 | * | 3/2007 | Schiffmann ........... G01S 7/4026 701/301 |
| 2009/0097038 | A1 | * | 4/2009 | Higgins-Luthman B60G 17/019 356/602 |
| 2010/0023211 | A1 | | 1/2010 | Ammon |
| 2010/0042292 | A1 | | 2/2010 | Schindler |
| 2010/0152969 | A1 | | 6/2010 | Li et al. |
| 2011/0190972 | A1 | * | 8/2011 | Timmons ............... G01C 21/34 701/31.4 |

FOREIGN PATENT DOCUMENTS

| | | | |
|---|---|---|---|
| DE | 102006039353 A1 | | 3/2008 |
| DE | 102008052134 A1 | | 4/2009 |
| DE | 102009040170 A1 | | 4/2010 |
| DE | 102009033219 A1 | | 7/2010 |
| DE | 102009021107 A1 | | 11/2010 |
| DE | 102010044263 A1 | | 3/2012 |
| EP | 157181 | * | 10/1985 |
| EP | 412719 A | * | 2/1991 |
| GB | 2151872 | * | 7/1985 |
| GB | 2355239 | * | 4/2001 |
| WO | WO8904498 | * | 5/1989 |
| WO | WO 95 01549 | * | 1/1995 |
| WO | WO03105089 | * | 12/2003 |
| WO | WO2004013572 | * | 2/2004 |
| WO | WO2010001811 | * | 1/2010 |

OTHER PUBLICATIONS

Sueharu Nagri, et al.; Improvement of Ride Comfort by Preview Vehicle-Suspension System; SAE Technical Paper Series 920277; International Congress & Exposition, Detroit, Michigan; Feb. 24-28, 1992 (9 pages).

Mark D. Donahue; Implementation of an Active Suspension, Preview Controller for Improved Ride Comfort; Boston University, 1998 (85 pages).

Ahmad Akbari Alvanagh; Multi-objective H/GH2 preview control of active vehicle suspensions; Munich, Germany, Oct. 2008 (142 pages).

German Office Action dated Mar. 12, 2014, 5 pages.

German Office Action for Application No. 102012218937.8 dated Apr. 28, 2016, 6 Pages.

* cited by examiner

VEHICLE SUSPENSION SYSTEM AND METHOD OF USING THE SAME

FIELD

The present invention generally relates to a vehicle suspension system and, more particularly, to an active or semi-active vehicle suspension system that evaluates an upcoming road segment and controls the system accordingly.

BACKGROUND

Some active and semi-active vehicle suspension systems make suspension-related adjustments based on road conditions as they are experienced or encountered by the vehicle. Such systems are commonly referred to as feed-back systems. However, it can be difficult to sense a current road condition, evaluate the road condition, and make the appropriate adjustments to the vehicle suspension system in a short amount of time. This is particularly true when the vehicle is being driven at a high rate of speed, as the lag-time between when a road condition is first encountered and when the feed-back system makes corresponding adjustments may be too long.

SUMMARY

According to one embodiment, there is provided a method for use with a vehicle suspension system installed on a vehicle. The method may comprise the steps of: (a) receiving road information from a vision system, where the road information pertains to an upcoming road segment; (b) using the road information to determine if the vehicle is expected to encounter an item in the upcoming road segment; (c) if the vehicle is expected to encounter an item in the upcoming road segment, then using the road information to determine a preemptive adjustment for the vehicle suspension system; and (d) making the preemptive adjustment to the vehicle suspension system before the vehicle encounters the item in the upcoming road segment.

According to another embodiment, there is provided a vehicle suspension system. The vehicle suspension system may comprise: a vision system configured to provide road information pertaining to an upcoming road segment; a suspension device; and a control module coupled to the vision system and the suspension device. The control module is configured to use the road information from the vision system to make an adjustment to the suspension device in a feed-forward manner.

DRAWINGS

Preferred exemplary embodiments will hereinafter be described in conjunction with the appended drawings, wherein like designations denote like elements, and wherein.

DESCRIPTION

The system and method described herein can inspect an upcoming road segment and use that information to control certain aspects of a vehicle suspension system. In an exemplary embodiment, several cameras are used to evaluate an upcoming road segment and to provide road information to a control module so that damping and/or other aspects of an active or semi-active suspension system can be controlled in a feed-forward manner. Because the vehicle suspension system assesses a segment of the road that is ahead of the vehicle, as opposed to one currently being encountered by the vehicle, the system may improve ride performance by anticipating and preparing for road conditions before they are actually encountered. Some potential benefits to using a preview-type or feed-forward system like this may include: improved wheel and/or body control, better synchronization between the vehicle suspension system and the road, and more optimized suspension rates, to cite a few. Although the following description is provided in the context of a vehicle suspension system, it should be appreciated that the system and method may be utilized in connection with other non-suspension systems, such as vehicle safety systems, vehicle stability systems, vehicle braking systems, etc.

Figure 1:
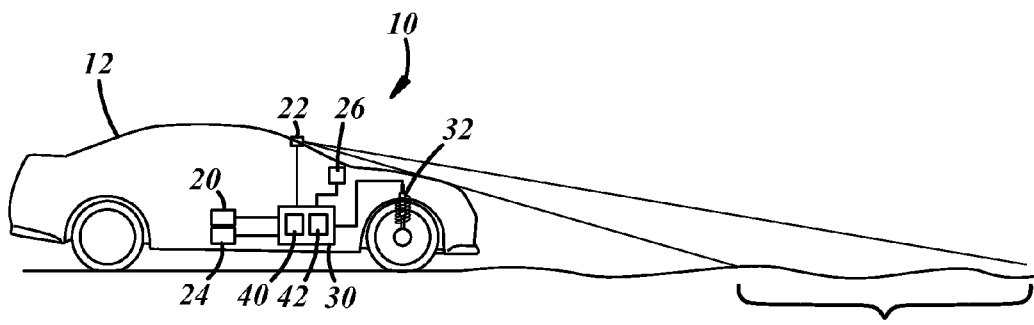
FIG. 1 is a schematic view of a vehicle having an exemplary vehicle suspension system that evaluates an upcoming road segment and makes corresponding adjustments based on that evaluation.

With reference to FIG. 1, there is shown a general and schematic view of an exemplary vehicle suspension system 10, where the system inspects an upcoming road segment 14 and prepares for various road conditions like potholes, sharp turns, steep inclines, etc. It should be appreciated that the present system and method may be used with any type of vehicle, including traditional vehicles, hybrid electric vehicles (HEVs), extended-range electric vehicles (EREVs), battery electrical vehicles (BEVs), motorcycles, passenger cars, sports utility vehicles (SUVs), cross-over vehicles, trucks, vans, buses, recreational vehicles (RVs), etc. These are merely some of the possible applications, as the system and method described herein are not limited to the exemplary embodiments shown in the figures and could be implemented in any number of different ways. According to one example, vehicle suspension system 10 includes vehicle sensor 20, vision system 22, navigation system 24, environmental sensor 26, control module 30, and suspension device 32.

Vehicle sensor 20 may be coupled to various components, devices, modules and/or systems in vehicle 12 and can provide vehicle suspension system 10 with vehicle sensor signals that pertain to different vehicle parameters. For example, vehicle sensor 20 may include one or more: speed sensor(s) that provide wheel and/or vehicle speed signals; dynamic sensor(s) that provide yaw rate, longitudinal and/or lateral vehicle acceleration signals; steering sensor(s) that provide steering angle signals; and/or any other suitable sensor that is mounted on the vehicle and provides information regarding some vehicle operating condition or parameter. It should be appreciated that vehicle sensor 20 may be embodied in hardware, software, firmware or some combination thereof. This sensor may directly sense or measure the conditions for which it is provided, or it may indirectly evaluate such conditions based on information provided by other sensors, components, devices, modules, systems, etc. Furthermore, this sensor may be directly coupled to control module 30, indirectly coupled via other electronic devices, a vehicle communications bus, network, etc., or coupled according to some other arrangement known in the art. This sensor may be integrated within another vehicle component, device, module, system, etc. (e.g., part of an engine control module (ECM), traction control system (TCS), electronic stability control (ESC) system, antilock brake system (ABS), etc.), it may be a stand-alone component, it may include multiple sensors, or it may be provided according to some other arrangement. Sensor 20 is illustrated in FIG. 1 as a single element or device, but it could include a number of different sensors located around the vehicle.

Vision system 22 may inspect, assess and/or otherwise evaluate an upcoming road segment and provide vehicle suspension system 10 with road information that pertains to that segment. This may be accomplished in a number of different ways. According to a non-limiting example, vision system 22 is a stereo vision system that includes two or more cameras (e.g., several megapixel black and white complementary metal-oxide-semiconductor (CMOS) cameras), and captures digital images of upcoming road segment 14 located approximately 1 m-10 m in front of the vehicle. The use of multiple cameras provides several different perspectives of the same image which can then be stitched, blended and/or otherwise combined in much the same manner as that used by human eyes. Vision system 22 may be mounted in various locations around the vehicle, including at a rear-view mirror assembly located near a top-center portion of the front windshield. By mounting vision system 22 at or near the rear-view mirror, as opposed to integrating it into a front bumper or other high-impact location, the vision system is less likely to require replacement or repair following an accident. Skilled artisans will appreciate that integrated vision systems are available that include multiple cameras and a module for processing the camera output, where the cameras and the module are all integrated into a single package or unit. Vision system 22 may be part of some other component, device, module and/or system in the vehicle, like a vehicle safety system or collision avoidance system; in such a case, the same cameras can be used by system 10. Although vision system 22 has been described in the context of a camera-based system, it is possible for the vision system to include a light detection and ranging (LIDAR) device, radio detection and ranging (RADAR) device, some other evaluation device, or a combination thereof.

Navigation system 24 may use the current location of the vehicle to provide a variety of navigation-related services to vehicle suspension system 10. Depending on the particular embodiment, navigation system 24 may be a stand-alone component or it may be integrated within some other component or system within the vehicle. The navigation system may include any combination of other components, devices, modules, etc., like a telematics unit or a GPS unit, and may use the current position of the vehicle and road- or map-data to evaluate the upcoming road segment and to provide corresponding road information. For instance, navigation system 24 may determine if there is a change in the upcoming road surface (e.g., if there is a transition from a paved road to a gravel road), it may determine if there is an abrupt change in the road features (e.g., fork in the road ahead, sharp turn, steep hill, significant change in speed limit, highway exit ramp, etc.), or it may detect some other change or transition in the road that is useful to vehicle suspension system 10 so that it can be properly prepared. In one example, navigation system 24 acts as a back-up or supplement to vision system 22 so that road information can still be provided even if there is a temporary problem with the vision system. Navigation system 24 can provide road information to control module 30 for use in controlling the vehicle suspension system in a feed-forward manner, as will be described.

Environmental sensor 26 may provide environmental signals that can be used to detect and/or evaluate environmental conditions affecting the vehicle. For example, environmental sensor 26 may include an outside temperature sensor, an outside humidity sensor, a precipitation sensor, and/or any other type of sensor that senses or gathers environmental readings and provides corresponding environmental signals to control module 30. The outside temperature sensor can indicate whether or not the presence of ice or snow is likely. Some examples of how environmental sensor 26 may determine environmental conditions include directly sensing and measuring environmental readings, indirectly determining environmental readings by gathering them from other modules or systems in the vehicle, or by receiving wireless transmissions that include weather reports, forecasts, etc. from a weather-related service or website. In the last example, the wireless transmissions may be received at a telematics unit which then conveys the pertinent environmental data to vehicle suspension system 10. Other examples of environmental sensors are possible as well.

Control module 30 may include any variety of electronic processing devices, memory devices, input/output (I/O) devices, and/or other known components, and may perform various control and/or communication related functions. In an exemplary embodiment, control module 30 includes an electronic memory device 40 that stores various sensor readings (e.g., sensor readings from sensors 20, 26), images from vision system 22, look-up tables or other data structures, algorithms (e.g., the algorithm embodied in the exemplary method described below), etc. Memory device 40 may also store pertinent characteristics and background information pertaining to vehicle 12, such as suspension-related parameters and settings, etc. Control module 30 may also include an electronic processing device 42 (e.g., a microprocessor, a microcontroller, an application specific integrated circuit (ASIC), etc.) that executes instructions for software, firmware, programs, algorithms, scripts, etc. that are stored in memory device 40 and may govern the processes and methods described herein. Control module 30 may be electronically connected to other vehicle devices, modules and systems via suitable vehicle communications and can interact with them when required. These are, of course, only some of the possible arrangements, functions and capabilities of control module 30, as other embodiments could also be used.

Depending on the particular embodiment, control module 30 may be a stand-alone vehicle electronic module (e.g., an active or semi-active suspension controller, etc.), it may be incorporated or included within another vehicle electronic module (e.g., suspension, body or chassis control module, etc.), or it may be part of a larger network or system (e.g., a traction control system (TCS), an electronic stability control (ESC) system, a vehicle safety system, driver assistance system, etc.), to name a few possibilities. Control module 30 is not limited to any one particular embodiment or arrangement.

Suspension device 32 couples a wheel to the vehicle and may include one of any number of different suspension-related components or parts. For example, suspension device 32 may be a damper, shock-absorber and/or other actuator in an active or semi-active vehicle suspension system that helps control the vertical movement of the wheel in response to the road surface. Suspension device 32 may be part of an active suspension system that adjusts both damping and the ride height of the vehicle, or it may be part of a semi-active suspension system that only adjusts damping. In one example, suspension device 32 includes an electro-magnet and a magneto-rheological (MR) damper filled with a fluid whose properties can be controlled by a magnetic field (e.g., the magnetic field can affect the viscous damping coefficient of the fluid). Thus, vehicle suspension system 10 can control or adjust the damping at a particular wheel by altering the amount of current and/or voltage that is provided to the electro-magnet in suspension device 32; increasing the current usually raises the compression/rebound rates of the damper, while decreasing the current softens the effect of the damper. Suspension device 32 may include other components and devices not mentioned above.

Again, the preceding description of exemplary vehicle suspension system 10 and the drawing in FIG. 1 are only intended to illustrate one potential embodiment, as the following method is not confined to use with only that system. Any number of other systems, arrangements, combinations and/or architectures, including those that differ significantly from the one shown in FIG. 1, may be used instead.

Figure 2:
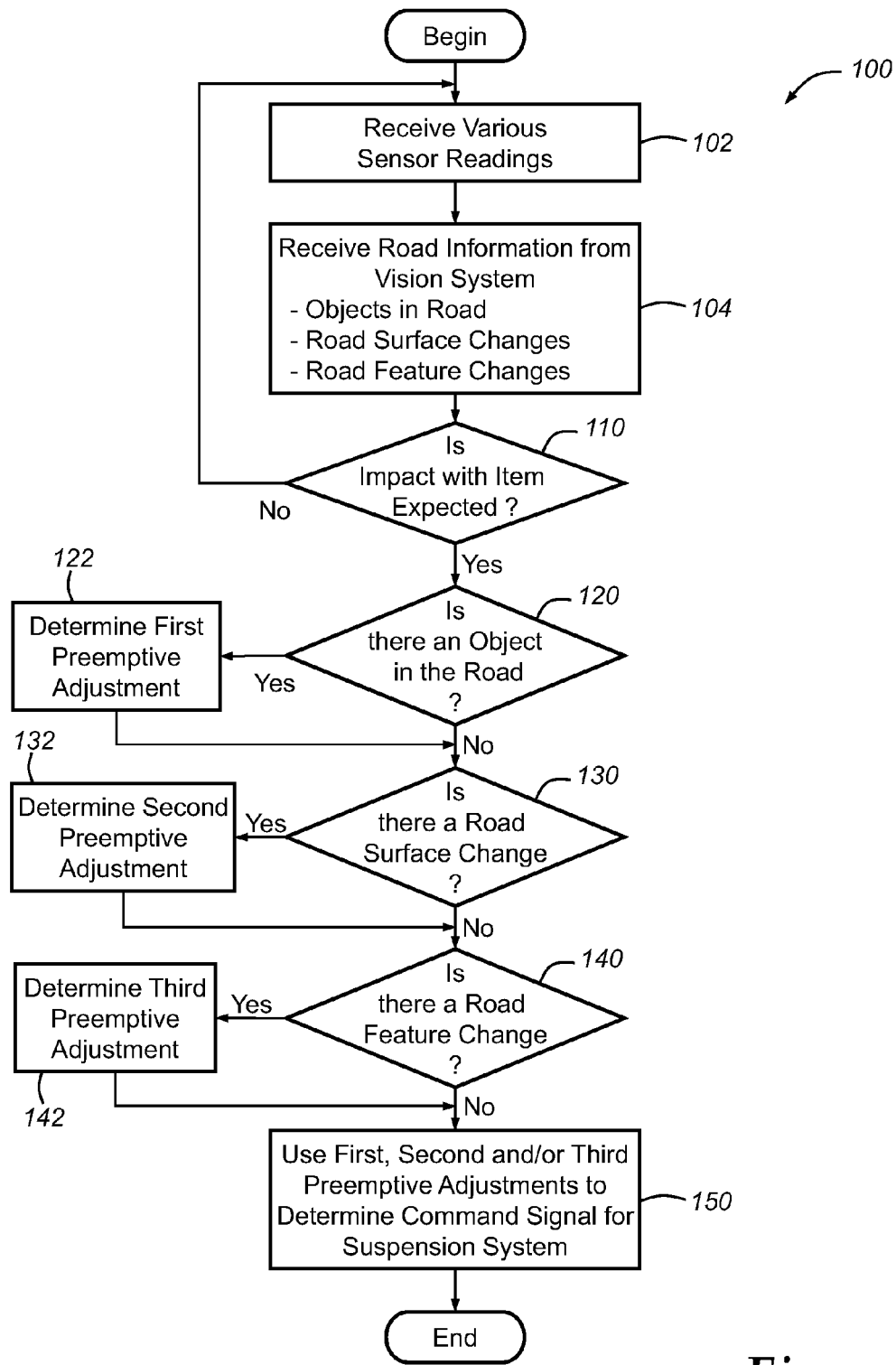
FIG. 2 is a flowchart of an exemplary method that may be used with a vehicle suspension system, such as the one shown in FIG. 1.

Turning now to FIG. 2, there is shown a flowchart illustrating some of the steps of an exemplary method 100 that may be used with vehicle suspension system 10. Other combinations and sequences of steps may be used instead, as the method shown in FIG. 2 is only one example. Step 102 receives different sensor readings or signals, such as those pertaining to conditions inside and/or outside of the vehicle, and may do so in a variety of ways. For instance, control module 30 may receive signals from vehicle sensor 20, navigation system 24, environmental sensor 26, or some other source. In one embodiment, step 102 gathers vehicle sensor signals in the form of vehicle speed signals, vehicle acceleration signals and/or steering angle signals from vehicle sensors 20, environmental signals from environmental sensor 26, or some combination thereof. The information obtained from these signals may be subsequently used in conjunction with the output from vision system 22 to help evaluate upcoming road segment 14, as will be explained.

Figure 4:
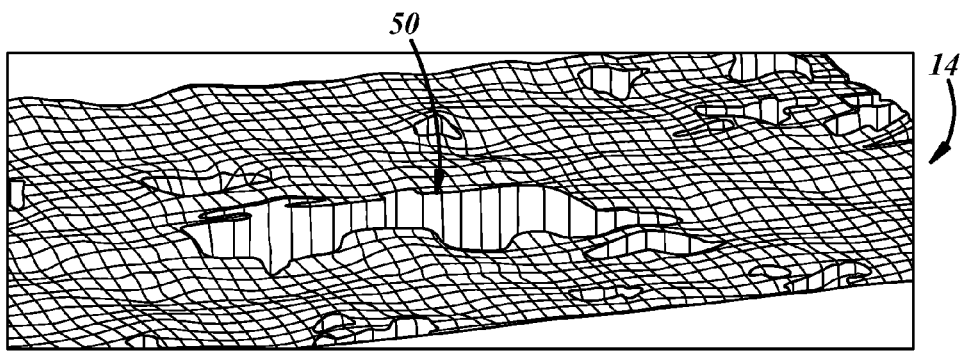
FIG. 4 is perspective view of a blended digital image of a portion of the upcoming road segment from FIG. 3.

Step 104 receives road information from vision system 22. The precise form, content and/or nature of the road information may vary depending on the particular setup of the system, and usually can be customized at the vision system. For example, vision system 22 can simply provide control module 30 with raw camera output, or the vision system can provide the control module with certain data or information that has been extracted from the camera output. It is not necessary for the camera output to be processed or analyzed by any particular component, so long as step 104 receives road information that pertains to upcoming road segment 14 and originates from vision system 22. In one potential embodiment, a module within vision system 22 stitches or blends together the output of two or more cameras and analyzes this output by measuring distances to different points on the blended digital image, as shown in FIG. 4. Such a technique may be used to obtain a collection of coordinates (e.g., x, y, z coordinates) for the different points on upcoming road segment 14, and may be done at a rate of between 10 and 50 frames/sec (e.g., about 20 frames/sec). Skilled artisans will appreciate that there are a number of different ways in which camera images may be analyzed for purposes of evaluating or inspecting the road in front of the vehicle, and that this step is not limited to any particular one. The term "road information," as used herein, broadly includes all types of images, coordinates, data and/or other information that pertains to upcoming road segment 14. Some examples of suitable road information include: raw camera images (stitched or non-stitched), processed camera images, and/or specific pieces of data or information that have been extracted or deduced from the camera images, to cite several possibilities.

The road information received in step 104 may reveal or identify different types of road conditions in the upcoming road segment, for example: objects in the road, road surface changes, and/or road feature changes. Beginning with the category of objects in the road, step 104 may receive road information that pertains to objects located in upcoming road segment 14, such as potholes, cracks, bumps, manhole covers, drains, debris, etc. Consider the example illustrated in FIGS. 3 and 4 where there is a large pothole 50 located in upcoming road segment 14, and vision system 22 provides control module 30 with the following pieces of road information: a position of the object (e.g., the x, y, z coordinates for each of the pixels that correspond to pothole 50), a size of the object, a distance to the object (e.g., a distance or time to impact for vehicle 12 and pothole 50), and/or a projected wheel path as it relates to the object (e.g., whether the driver-side wheels, passenger-side wheels or both will encounter pothole 50 according to a path-prediction feature). Of course, the precise nature and content of the road information received in step 104 can differ, as the preceding examples only represent some of the possibilities.

Turning now to the category of road surface changes, step 104 may receive road information that pertains to various road surface changes, like transitions between concrete, asphalt, cobblestone, gravel, dirt, etc. With reference again to the example shown in FIG. 3, vision system 22 may provide control module 30 with road information that indicates a change or transition 60 in the surface of upcoming road segment 14, such as a change from one material to another that can cause chatter or other undesirable effects. Some examples of suitable road information that may indicate a change in the road surface include: a description of the road surface change (e.g., a qualitative or quantitative description of transition 60), a position of the road surface change (e.g., x, y, z coordinates for each of the pixels along transition 60), a distance to the road surface change (e.g., a distance or time to impact for vehicle 12 and transition 60), and/or the projected wheel path as it relates to the road surface change (e.g., whether the driver-side wheels, passenger-side wheels, or both will encounter transition 60 according to a path-prediction feature). One way to provide a qualitative description of road surface change 60 is to consider the attributes of the different sections of upcoming road surface 14 (e.g., the z-axis coordinates), and then to categorize the different sections based on that information; such an approach could result in classifications like "concrete," "cobblestone" and "gravel," and could reveal transitions or changes between different surfaces. One way to provide a quantitative description involves mathematically evaluating the heights of different upcoming road surface sections and providing some numerical description of those heights (e.g., calculating an average height or a variance in height for a particular section). Road surface changes may also pertain to weather-related conditions, such as if the road is wet, snowy, icy, etc., and may be discernable from the road information received in step 104 and/or the environmental signals received from environmental sensor 26.

With respect to the category of road feature changes, step 104 may receive road information that pertains to changes or transitions in road features, like sharp turns or bends in the road. To illustrate this feature, consider the example where vision system 22 provides control module 30 with road information that relates to upcoming road segment 14, which includes a steep incline or hill beginning at 70. The road feature change may be addressed or represented in the road information in a variety of ways, including in the following non-limiting examples: a description of the road feature change (e.g., a qualitative or quantitative description of hill 70), a position of the road feature change (e.g., x, y, z coordinates for each of the pixels at hill 70), a distance to the road feature change (e.g., a distance or time to impact for vehicle 12 and hill 70), and/or the projected wheel path as it relates to the road feature change (e.g., whether the driver-side wheels, passenger-side wheels, or both will encounter hill 70 using a path-prediction feature). Step 104 may simply identify the road feature change according to its type or category (e.g., curve, bend, incline, decline, etc.) or it could be more descriptive and describe it in terms of a large, medium or small curve, bend, incline, decline, etc.; these are both qualitative descriptions. It is also possible for this step to provide road information that quantitatively describes the road feature change, like providing numerical data regarding the grade, angle or elevation change of hill 70, or the radius or angle of an upcoming bend in the road; these are examples of quantitative descriptions.

The exact nature, form and/or content of the road information that is received from vision system 22 in step 104 is not limited to the examples in the preceding paragraphs, as this information may be received in any number of different ways. For example, it is possible to extract or derive other pieces of data from the road information, such as vehicle yaw rate, heave, pitch and roll, etc. The communication and interaction between vision system 22 and control module 30 may be arranged according to any number of different embodiments. It should be appreciated that step 104 may augment or supplement the road information from vision system 22 with road information from other sources, like navigation system 24. By using output from vision system 22 in conjunction with that from navigation system 24, a fuller or more complete picture of upcoming road segment 14 may be developed. This can be particularly helpful if the vision system is temporarily obstructed or experiences a malfunction so that it is unable to produce usable images. The use of road information from navigation system 24 is optional, but is certainly not necessary for all applications.

Step 110 then determines if an impact or encounter is expected involving one or more items in the upcoming road segment 14. For example, step 110 may review the road information gathered in the previous step and determine if the vehicle is likely to encounter an object in the road, a road surface change, and/or a road feature change. If an encounter with any of these items (also, referred to as road conditions) is likely, then the method can preemptively prepare for such an event by making certain adjustments to suspension device 32, as will be explained. Step 110 may simply check for the presence or possibility of an expected impact, or it could use some type of qualitative or quantitative threshold to determine the likelihood of such an event; any number of suitable methods may be used to determine if an impact or encounter is anticipated. If step 110 expects or anticipates an impact, then the method may continue and prepare for the resulting suspension event in the following steps. If, on the other hand, step 110 determines that an impact is not likely or expected, then the method may loop back to step 102 for continued monitoring.

Those skilled in the art will appreciate that additional steps may be added between steps 110 and 102 when the method is looping back for continued monitoring. For example, vehicle sensors 20 may take additional sensor readings and determine if the vehicle is currently encountering some type of road conditions that warrant making adjustments to suspension device 32; that is, a more conventional active or semi-active suspension system utilizing a feed-back system, as opposed to a feed-forward system. Any number of other suspension system features may be used with system 10, as the present method may employ or utilize other systems, arrangements and/or features as well. One such example is the active suspension system described in U.S. Patent Application Publication No. 2010/0152969, which is owned by the present assignee and is incorporated herein by reference.

Turning now to steps 120-150, the method evaluates the expected impact and makes corresponding suspension system adjustments in advance so that the vehicle can optimize the suspension settings before the vehicle actually encounters the anticipated road conditions. Step 120 determines if the expected impact involves an object in the road, which is one of the above-described categories of road information that is derived from the output of vision system 22. If step 120 concludes that there is a pothole, drain, bump, debris and/or other object in the road, then the method proceeds to step 122 so that a preemptive adjustment for the suspension system can be developed. Preemptive adjustments may include any change, modification and/or other adjustment to a suspension parameter, such as a damping rate, a damping stiffness, a vehicle height, a vehicle inclination, etc. If step 120 instead determines that there is no object in the road, then the method may proceed to step 130 without calculating a preemptive adjustment.

Step 122 may use one of a variety of techniques for calculating, establishing and/or otherwise determining a first preemptive adjustment for suspension device 32. According to one potential technique, step 122 assigns the preemptive adjustment a predetermined value based on the type, location and/or size of the object that was detected in the upcoming road segment 14. A look-up table or other data structure may be used for this purpose. For example, a two-dimensional look-up table could be used that assigns a preemptive adjustment based on the size of the object detected, or a three-dimensional look-up table could be used that assigns a preemptive adjustment based on both the size of the object detected and the vehicle speed or some other vehicle parameter. Another possibility involves the use of road information gathered in steps 102-104 to calculate the expected effect that the object will actually have on suspension device 32 and then to determine a preemptive adjustment to counteract the expected effect, as explained in the following paragraph.

Figure 3:
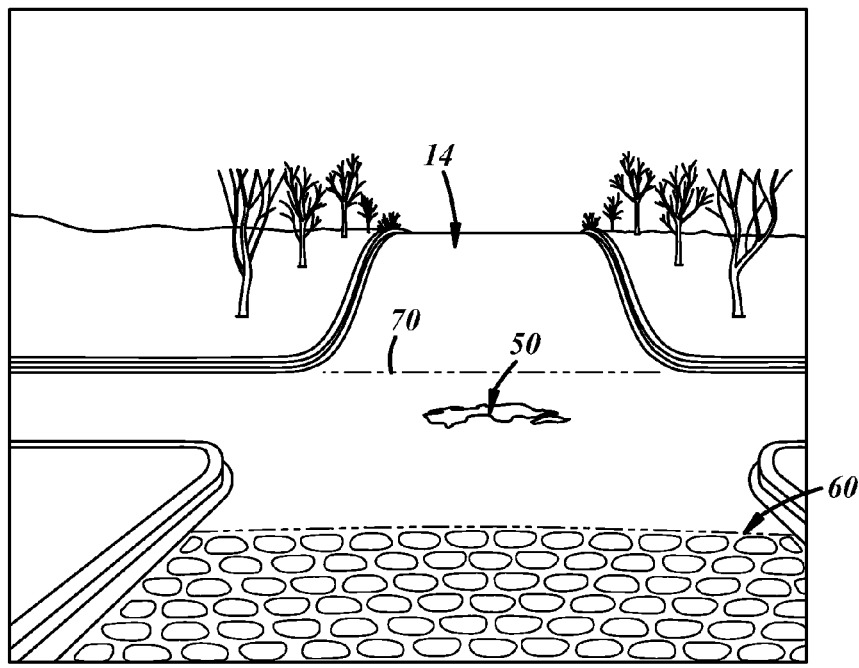
FIG. 3 is a perspective view of an exemplary upcoming road segment that includes an object in the road, a road surface change, and a road feature change.

With reference to the example illustrated in FIGS. 3 and 4, step 122 may use the size of pothole 50, the current vehicle speed and/or other vehicle parameters as input to an algorithm in order to determine an expected effect of the impact; that is, how much effect the impact with the pothole will actually have on suspension device 32, and then develop a counteracting preemptive adjustment. Based on the size of pothole 50 (e.g., its length, width and height above the surrounding road surface) and the fact that the vehicle is traveling at a certain speed, step 122 may estimate that the impact will cause suspension device 32 to move or compress by 4 cm. A preemptive adjustment may be developed that is designed to stiffen suspension device 32 and counteract or resist the 4 cm of movement. Of course, other techniques and data may be used to develop the preemptive adjustment in step 122, as the preceding examples only represent some of the possibilities. Now that step 122 has determined a first preemptive adjustment for suspension device 32, it may also determine when the expected impact will occur and which side of the vehicle it will likely occur on. The distance to impact with the object and the position of the object, as provided in step 104, may be used in conjunction with vehicle speed or other vehicle parameters to make these determinations. Suspension devices 32 located on the driver and passenger sides of the vehicle, the front and rear of the vehicle, or elsewhere may be controlled independently or separately from one another so that different wheels or corners of the vehicle will receive different command signals. Of course, all suspension devices 32 located at the various wheels or corners may be controlled in unison as well.

Step 130 determines if the expected impact involves a road surface change. If this step concludes that there is an upcoming change in road surface (e.g., the change illustrated in FIG. 3 which transitions from cobblestone to asphalt), then the method proceeds to step 132 so that an appropriate preemptive adjustment to suspension device 32 can be developed. If step 130 determines that there is no expected change in road surface, then the method may proceed to step 140. Techniques similar to those described above in connection with step 122 may be used here for determining a second preemptive adjustment. For example, step 132 may have a set of predetermined preemptive adjustments for each of the different road surface changes or transitions (e.g., a transition from cobblestone to asphalt corresponds to a certain preemptive adjustment, a transition from concrete to dirt another preemptive adjustment, and so-on). A look-up table or other data structure may be used for this purpose. It is also possible for step 132 to try and quantify or calculate an expected effect for the road surface change; that is, how much effect will the road surface change have on suspension device 32 when the vehicle impacts or encounters it by determining how much movement (e.g., 1 cm-10 cm in movement) will occur in one or more of the suspension system components.

Step 140 determines if the expected impact involves a road feature change, like a sharp turn or a steep incline in upcoming road segment 14. If certain road features are expected, then the method proceeds to step 142 so that a preemptive adjustment can be developed for the anticipated road feature. If step 140 determines that there is no road feature that warrants a preemptive adjustment or change to the suspension system, then the method may continue without making the adjustments of step 142. As with step 132, this step may utilize techniques similar to those described above in connection with step 122 to determine a third preemptive adjustment. More specifically, step 142 may qualitatively assign a predetermined value to the third preemptive adjustment based on the general type or size of the upcoming road feature, or it may instead calculate a preemptive adjustment based on the anticipated effect that the road feature will have on suspension device 32. With reference to the example shown in FIGS. 3 and 4, step 142 may try and calculate the actual effect that the steep incline 70 will have on suspension device 32 so that the suspension system is prepared when the vehicle actually encounters the hill. Information such as the size and position of the road feature (e.g., the x, y, z coordinates of different pixels corresponding to the incline), attributes of the road feature (e.g., the grade, angle or elevation change of hill 70), vehicle speed, etc. may all go into determining a suitable preemptive response. In the case of sharp turns, bends or embankments, step 142 may employ some type of body dynamics calculations (e.g., such as those used to determine body heave, pitch and roll) when calculating an appropriate preemptive adjustment. Skilled artisans will appreciate that lateral and/or longitudinal acceleration, as well as yaw rate, steering angle, etc. may be used in such calculations.

If step 110 determined that an impact is expected, then it is assumed in method 100 that that impact would be related to one of the different categories of suspension events addressed in steps 120, 130 and/or 140. However, it should be appreciated that additional and/or other categories of impacts may be used by the present method. In addition, it is certainly possible for there to be multiple items or road conditions that lead to an expectation of an impact. For example, an object could be detected on a sharp turn (i.e., an object in the road and a road feature change) or a change from concrete to cobblestone could be identified on a steep decline (i.e., a road surface change and a road feature change). Other combinations of items and road conditions are also possible, including ones where three or more categories of road conditions are identified in the upcoming road segment 14. It is possible for the method to include a catch-all type step at this point that is intended to address all other conditions that could result in an expected impact, but are not addressed by steps 120, 130 or 140. Such a step is optional.

Step 150 combines the first, second and/or third preemptive adjustments in order to generate a command signal for the suspension system. There a number of ways in which step 150 could be carried out, including adding the various preemptive adjustments together to arrive at an overall command signal that controls one or more operational parameters of suspension device 32. This approach would not necessarily provide any precedent or weighting for one preemptive adjustment over another. In a different embodiment, step 150 may weight or apportion the contributions of each of the preemptive adjustments so that the command signal takes this into account. For example, assume that the method determines that the vehicle is going to encounter a pothole in the road that required a certain amount of suspension system stiffening, and at the same time the vehicle is expected to encounter a hill or decline that calls for a certain amount of loosening. Step 150 could give some deference to the object in the road, such that the preemptive adjustment stemming from that road condition is weighted more than preemptive adjustment corresponding to the hill. In some instances, step 150 will only have to consider a single preemptive adjustment (i.e., where only one of steps 120, 130 and 140 is satisfied), in other instances step 150 will have to combine multiple suspension adjustments together. Step 150 may give a higher weighting to objects in the road, as such objects can produce greater impact hardness.

The precise nature of the command signal is somewhat dictated by the type of suspension system 10 and/or suspension device 32. For instance, if suspension device 32 is a magneto-rheological (MR) system with magnetic particles in the shock fluid, then the command signal may adjust the amount of current and/or voltage that is used to control the MR system. Generally speaking, more electrical current causes the suspension system to become stiffer, while less electrical current causes the system to become looser. Other types of suspension systems (e.g., including hydraulic, pneumatic, electro-mechanical, etc.) may be used instead as the present method is certainly not limited to MR-type systems. Assuming that the particular suspension system allows it, separate command signals may be generated and sent out to the different wheels or corners of the vehicle (e.g., driver versus passenger side, front versus rear, individual wheels or corners, etc.) so that they are controlled separately or independently.

Once a command signal is developed, this signal can be sent from control module 30 to suspension device 32 in order to adjust, change and/or otherwise control the suspension device in anticipation of the expected impact. These signals may control the damping or tuning of the active or semi-active suspension system. Skilled artisans will appreciate that oftentimes suspension systems based on feed-back are set up with minimum damping rates that will absorb the energy of a worst-case scenario impact, as they cannot react fast enough once such an impact is detected. The exemplary method described above, however, may avoid unnecessarily operating a suspension system according to worst-case scenarios because it expects to have preemptive adjustments to the suspension system in place before the vehicle actually encounters them, which in turn can improve the ride quality and performance of suspension system 10. Other potential benefits and advantages are possible as well.

It is also possible for the method to utilize some type of final check before determining and/or sending the command signal to suspension device 32, where the final check can make sure the vehicle is not currently engaged in any extreme driving maneuvers or encountering certain conditions that would make adjustments to suspension device 32 undesirable. For example, the optional step could check the readings gathered from vehicle sensors 20 and/or environmental sensors 26 and hold off issuing any command signals to adjust the suspension system if the driver was currently slamming on the brakes or turning the steering wheel according to a large steering angle. Other conditions could be checked as well.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for use with a vehicle suspension system, comprising the steps of:
   a) receiving road information from a plurality of cameras that are part of a stereo vision system, the plurality of cameras are arranged to provide the stereo vision system with camera output of a common image of an upcoming road segment that is taken from different perspectives, and the road information pertains to the upcoming road segment and is extracted from a blended digital image that is stitched, blended or otherwise combined from the camera output of the plurality of cameras of the stereo vision system;
   b) evaluating the road information from the blended digital image to determine whether the vehicle is expected to encounter a plurality of items in the upcoming road segment;
   c) when the vehicle is expected to encounter a plurality of items in the upcoming road segment,
   then measuring a distance between different points on each item in the blended digital image and including the measured distance with the road information,
   calculating an expected effect that is at least partially based on the road information from the blended image and is a quantitative estimate of the impact that the each item will have on the vehicle suspension system, and determining a plurality of preemptive adjustments for the vehicle suspension system that is at least partially based on the calculated expected effect and is a customized adjustment for the each specific item in the upcoming road segment so as to counteract the expected effect:
   combining the plurality of preemptive adjustments in order to generate a command signal for the vehicle suspension system, wherein a first preemptive adjustment is given a higher weighting than a second preemptive adjustment when the first and the second preemptive adjustments are combined in order to generate the command signal for the vehicle suspension system; and
   d) making a preemptive adjustment to the vehicle suspension system in accordance with the command signal before the vehicle encounters one of the items in the upcoming road segment.

2. The method of claim 1, wherein step (a) further comprises receiving road information from the blended digital image in the form of a collection of coordinates for different points on the upcoming road segment.

3. The method of claim 1, wherein step (a) further comprises receiving road information that pertains to an object located in the upcoming road segment, and the road information includes at least one of the following pieces of information: a position of the object, a size of the object, a distance to the object, or a projected wheel path as it relates to the object.

4. The method of claim 1, wherein step (a) further comprises receiving road information that pertains to a road surface change in the upcoming road segment, and the road information includes at least one of the following pieces of information: a description of the road surface change, a position of the road surface change, a distance to the road surface change, or a projected wheel path as it relates to the road surface change.

5. The method of claim 4, wherein step (a) further comprises receiving road information that pertains to a road surface change and includes a qualitative description of the road surface change that uses different categories of road surfaces.

6. The method of claim 1, wherein step (a) further comprises receiving road information that pertains to a road feature change in the upcoming road segment, and the road information includes at least one of the following pieces of information: a description of the road feature change, a position of the road feature change, a distance to the road feature change, or a projected wheel path as it relates to the road feature change.

7. The method of claim 6, wherein step (a) further comprises receiving road information that pertains to a road feature change and includes a qualitative description of the road feature change that uses different categories of road features.

8. The method of claim 1, wherein step (a) further comprises receiving road information from a vision system and a navigation system; and step (c) further comprises using the road information from the vision system and the navigation system to determine at least one of the preemptive adjustments for the vehicle suspension system.

9. The method of claim 1, wherein step (c) further comprises using one or more pieces of information from the road information to assign a predetermined value to at least one of the preemptive adjustments for the vehicle suspension system.

10. The method of claim 9, wherein step (c) further comprises using at least one of the following pieces of information as input to a look-up table in order to assign a predetermined value to at least one of the preemptive adjustments for the vehicle suspension system: a position of an item, a size of an item, a distance to an item, or a projected wheel path.

11. The method of claim 10, wherein step (c) further comprises using a size of an object located in the upcoming road segment and a vehicle speed as input to a look-up table in order to assign a predetermined value to at least one of the preemptive adjustments for the vehicle suspension system.

12. The method of claim 1, wherein step (c) further comprises using one or more pieces of information from the road information to calculate an expected effect that each item will have on the vehicle suspension system, and then determining the plurality of preemptive adjustments for the vehicle suspension system to counteract the expected effect.

13. The method of claim 12, wherein step (c) further comprises using at least one of the following pieces of information as input to an algorithm in order to determine at least one of the preemptive adjustments for the vehicle suspension system: a position of an item, a size of an item, a distance to an item, or a projected wheel path.

14. The method of claim 13, wherein step (c) further comprises using a size of an object located in the upcoming road segment and a vehicle speed as input to an algorithm in order to calculate the expected effect, and determining at least one preemptive adjustment for the vehicle suspension system that will counteract the expected effect.

15. A method for use with a vehicle suspension system, wherein the vehicle suspension system includes a magneto-rheological (MR) damper, the method comprising the steps of:
  a) receiving road information from a plurality of cameras that are part of a stereo vision system, the plurality of cameras are arranged to provide the stereo vision system with camera output of a common image of an upcoming road segment that is taken from different perspectives, and the road information pertains to the upcoming road segment and is extracted from a blended digital image that is stitched, blended or otherwise combined from the camera output of the plurality of cameras of the stereo vision system;
  b) evaluating the road information from the blended digital image to determine whether the vehicle is expected to encounter an item in the upcoming road segment;
  c) when the vehicle is expected to encounter an item in the upcoming road segment, then measuring a distance between different points on the item in the blended digital image and including the measured distance with the road information, calculating an expected effect that is at least partially based on the road information from the blended image and is a quantitative estimate of the impact that the item will have on the vehicle suspension system, and determining a preemptive adjustment for the vehicle suspension system that is at least partially based on the calculated expected effect and is a customized adjustment for the specific item in the upcoming road segment so as to counteract the expected effect; and
  d) making the preemptive adjustment to the vehicle suspension system by adjusting a current, a voltage or both that is provided to the magneto-rheological (MR) damper before the vehicle encounters the item in the upcoming road segment.

16. The method of claim 1, wherein the vehicle suspension system includes a plurality of individual suspension devices and step (d) further comprises making preemptive adjustments for the vehicle suspension system by sending a first command signal to a first suspension device and sending a second command signal to a second suspension device, wherein the first and second command signals control the first and second suspension devices separately.

17. A vehicle suspension system, comprising:
  a stereo vision system having a plurality of cameras configured to provide road information pertaining to an upcoming road segment, the plurality of cameras are arranged to provide the stereo vision system with camera output of a common image of an upcoming road segment that is taken from different perspectives, and the road information is extracted from a blended digital image that is stitched, blended or otherwise combined from the camera output of the plurality of cameras;
  a suspension device that includes a magneto-rheological (MR) damper filled with a fluid whose properties are controlled by a magnetic field and affect the performance of the damper; and
  a control module coupled to the stereo vision system and the suspension device, wherein the control module or the stereo vision system is configured to measure a distance between different points on an item in the upcoming road segment in the blended digital image and include the measured distance with the road information, and the control module is configured to calculate an expected effect that is at least partially based on the road information from the blended image and is a quantitative estimate of the impact that the item in the upcoming road segment will have on the vehicle suspension system, and to make an adjustment to the suspension device in a feed-forward manner that is at least partially based on the calculated expected effect and is a customized adjustment for the specific item in the upcoming road segment so as to counteract the expected effect.

* * * * *